(12) United States Patent
Cho et al.

(10) Patent No.: US 9,130,675 B2
(45) Date of Patent: Sep. 8, 2015

(54) SIGNAL TRANSMISSION APPARATUS AND OPTICAL MODEM MODULATION METHOD

(71) Applicant: Electronics and Telecommunications Research Institute, Daejeon (KR)

(72) Inventors: Seung Hyun Cho, Daejeon (KR); Jie Hyun Lee, Daejeon (KR); Kwang Ok Kim, Jeonbuk (KR); Eui Suk Jung, Daejeon (KR); Seung Il Myong, Daejeon (KR); Sang Soo Lee, Daejeon (KR); Jong Hyun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 285 days.

(21) Appl. No.: 13/729,521

(22) Filed: Dec. 28, 2012

(65) Prior Publication Data

US 2013/0170830 A1    Jul. 4, 2013

(30) Foreign Application Priority Data

Dec. 30, 2011    (KR) .................. 10-2011-0147647

(51) Int. Cl.
*H04B 10/272* (2013.01)
*H04B 10/564* (2013.01)
(Continued)

(52) U.S. Cl.
CPC .............. *H04B 10/27* (2013.01); *H04B 10/272* (2013.01); *H04B 10/564* (2013.01); *H04B 17/0035* (2013.01)

(58) Field of Classification Search
CPC .... H04B 10/07; H04B 10/071; H04B 10/079; H04B 10/0793; H04B 10/0795; H04B 10/07955; H04B 10/272; H04B 10/50; H04B 10/564; H04B 17/00; H04B 17/0002; H04B 17/0025; H04B 17/0035
See application file for complete search history.

(56) References Cited

U.S. PATENT DOCUMENTS 5,179,420 A * 1/1993 So et al. ................. 356/73.1
5,636,264 A * 6/1997 Sulavuori et al. ........... 398/41
(Continued)

FOREIGN PATENT DOCUMENTS

| EP | 2068520 A1 | 6/2009 |
|---|---|---|
| EP | 2337245 A1 | 6/2011 |
| JP | 2009-284454 | 12/2009 |

OTHER PUBLICATIONS

Chow, C.W. et al., "Rayleigh Backscattering Performance of OFDM-QAM in Carrier Distributed Passive Optical Networks," IEEE Photonics Technology Letters, vol. 20(22):1848-1850 (2008).

(Continued)

*Primary Examiner* — Darren E Wolf
(74) *Attorney, Agent, or Firm* — Nelson Mullins Riley & Scarborough LLP; Anthony A. Laurentano, Esq.; Lewis Lee, Esq.

(57) ABSTRACT

A modulation method of an optical modem and a signal transmission apparatus performing the method are disclosed. The modulation method of the optical modem includes an optical interface providing a signal to a light source, a photo detector receiving reflected light by an optical link when output light from the light source based on the provided signal is reflected by the optical link, the photo detector measuring and determining characteristics of the optical link using the reflected light, and the optical modem determining a power level and a modulation method for each subcarrier based on the characteristics of the optical link.

17 Claims, 4 Drawing Sheets

(51) Int. Cl.
  *H04B 10/27* (2013.01)
  *H04B 17/00* (2015.01)

(56) References Cited

U.S. PATENT DOCUMENTS

2010/0054735 A1  3/2010  Wei et al.
2011/0001959 A1* 1/2011  Hasegawa .................... 356/73.1
2012/0082462 A1* 4/2012  Mariotti et al. ............... 398/135

OTHER PUBLICATIONS

Giacoumidis, E. et al., "Statistical Investigations of Optical OFDM Adaptive Loading Algorithm over 1000 Worst-Case MMFs," Optical Fiber Communication Conference and Exposition (OFC/NFOEC), 2011 and the National Fiber Optic Engineers Conference, pp. 1-3 (2011).

Hsu, Dar-Zu et al., "2.1-Tb/s-km OFDM Long-Reach PON Transmission using a Cost-Effective Electro-Absorption Modulator," Optical Fiber Communication Conference and Exposition (OFC/NFOEC), 2011 and the National Fiber Optic Engineers Conference, pp. 1-3 (2011).

Ng'Oma, Anthony et al., "31 Gbps RoF System Employing Adaptive Bit-Loading OFDM Modulation at 60 GHz," Optical Fiber Communication Conference and Exposition (OFC/NFOEC), 2011 and the National Fiber Optic Engineers Conference, pp. 1-3 (2011).

Qian, Dayou et al., "64/32/16QAM-OFDM using Direct-Detection for 40G-OFDMA-PON Downstream," Optical Fiber Communication Conference and Exposition (OFC/NFOEC), 2011 and the National Fiber Optic Engineers Conference, pp. 1-3 (2011).

* cited by examiner

FIG. 3

| Number of splits / Distance | 16 splits | 32 splits | 64 splits | 128 splits |
|---|---|---|---|---|
| 20Km | A1 | B1 | C1 | D1 |
| 40Km | A2 | B2 | C2 | D2 |
| 60Km | A3 | B3 | C3 | D3 |
| 80Km | A4 | B4 | C4 | D4 |
| 100Km | A5 | B5 | C5 | D5 |
| 120Km | A6 | B6 | C6 | D6 |

SIGNAL TRANSMISSION APPARATUS AND OPTICAL MODEM MODULATION METHOD

CROSS-REFERENCE TO RELATED APPLICATION

This application claims the priority benefit of Korean Patent Application No. 10-2011-0147647, filed on Dec. 30, 2011, in the Korean Intellectual Property Office, the disclosure of which is incorporated herein by reference.

BACKGROUND

1. Field of the Invention

The present invention relates to a signal transmission apparatus and a modulation method of an optical modem, and more particularly, to a method and apparatus for optimizing a modulation method of an optical modem in an orthogonal frequency division multiple access-passive optical network (OFDMA-PON).

2. Description of the Related Art

Currently, an intensity modulation/direct detection (IM/DD) optical orthogonal frequency division multiplexing (OFDM) system is attracting more and more attention as next-generation optical access network technology since the IM/DD optical OFDM system enables cost-effective optical transmission, effectively controls network resources, and also does not need any compensation technology for optical impairment in long-distance ultrahigh-speed transmission.

For the optical OFDM system, various adaptive loading algorithms have been being suggested, which measured a decrease of a signal to noise ratio experienced by each subcarrier in transmission media and enable each subcarrier to have a different bit and power level based on previously measured SNR (signal to noise ratio). Popular algorithms currently in use include a bit-loading algorithm, a power-loading algorithm, and a bit-and-power loading algorithm which is a combination of a bit-loading algorithm and a power-loading algorithm.

A bit-loading (BL) algorithm has the same electric power level for each subcarrier in the OFDM system but uses a modulation format mapped differently for the each subcarrier. Conversely, a power-loading (PL) algorithm provides the same modulation format for the each subcarrier in the OFDM system but has an electric power level set differently for the each subcarrier. Further, a combination of a bit-loading algorithm and a power-loading algorithm, a bit-and-power loading (BPL) algorithm, enables subcarriers to have different modulation formats and electric power levels, respectively, and maximizes transmission performance and a bandwidth in transmission systems.

Among three aforementioned algorithms, the BPL algorithm involves highly advanced digital signal processing technology and a very complicated design for an optical OFDM modem since it can optimize a transmission bandwidth and performance.

In a conventional OFDMA-PON system, in order for the entire system to identify frequency-response characteristics for the BL, PL, and BPL algorithms used to maximize a transmission performance, an OFDM transmission apparatus and an OFDM reception apparatus transmit and detect a pilot signal and analyze frequency-response characteristics of the entire system based on the pilot signal, an upper level, that is, a media access control (MAC) layer, controls a modulation method and an electric power level for each subcarrier corresponding to the frequency-response characteristics of the entire system, and a baseband modem maps and transmits a signal. In this method, however, not only a physical layer but also a MAC layer needs an additional function of analyzing and controlling the frequency-response characteristics, and the transmission apparatus and the reception apparatus may pair together to transmit, receive and analyze the pilot signal. That is, since a large number of elements with complicated functions require functions for analyzing the frequency-response characteristics, disadvantages on terms of cost and complexity may be present.

Further, when a logical/physical link is not established between the transmission apparatus and the reception apparatus, the loading algorithms may not be applied. Since the loading algorithms are designed for transmission characteristics of a wireless signal involving considerably changeable channel environments, application of the algorithms is substantially limited when relatively stable frequency-response characteristics are extracted as in a next-generation optical access network system generally using a single-mode optical fiber as a transmission media.

SUMMARY

An aspect of the present invention provides an apparatus and method for maximizing transmission performance of an optical orthogonal frequency-division multiplexing (OFDM) signal by predicting a length of an optical link and an optical power budget, in advance, by additionally using a fewer number of relatively simple functional elements in an orthogonal frequency division multiple access-passive optical network (OFDMA-PON), that is, a next-generation optical access network system utilizing a single-mode optical fiber as a main transmission media.

According to an aspect of the present invention, there is provided a modulation method of an optical modem including an optical interface providing a signal to a light source, a photo detector receiving reflected light by an optical link when output light from the light source based on the provided signal is reflected by the optical link the photo detector determining an characteristic of the optical link using the reflected light and the optical modem determining a power level and a modulation method for each subcarrier based on the characteristic of the optical link.

The determination of the characteristic of the optical link may distinguish a length of an optical fiber through which the output light is transmitted or a number of splits included in an optical splitter using the reflected light.

The determination of the power level and the modulation method for the subcarrier may select a power level and a modulation method for the each subcarrier corresponding to a length of the optical fiber and the number of splits included in the optical splitter, based on a previously defined look-up table.

An optical path of the reflected light may be changed by the optical splitter so that the reflected light is not re-injected into the light source.

The determination of the power level and the modulation method for the subcarrier may select a modulation method having a lower subcarrier modulation speed as a length of an optical fiber increases and an optical splitter has a large number of splits.

The determination of the power level and the modulation method for the subcarrier may increase the power level of each subcarrier as a length of an optical fiber increases and corresponding to an optical splitter in which a greater number of splits are present.

The reflected light may be generated by Rayleigh scattering or Fresnel reflection during transmission through an optical link.

According to an aspect of the present invention, there is provided a signal transmission apparatus including a light source to emit output light, an optical interface to provide a signal so that the light source offers the output light, an optical splitter to change an optical path of light reflected by an optical link, a photo detector to receive the light reflected by an optical link, to determine an characteristic of the optical link, and an optical modem to determine a power level and a modulation method for each subcarrier based on the characteristic of the optical link.

According to an aspect of the present invention, there is provided a modulation method of an optical modem included in an optical line terminal (OLT) or an optical network unit (ONU) for forming an OFDMA-PON, the modulation method including a light source for emitting output light, a photo detector for receiving and determining a length and a loss characteristic of an optical fiber included in an optical link through which the output light travels, and an optical modem for controlling a power level and a bit allocated to a each subcarrier for an optical OFDM signal based on the length and the loss characteristic of the optical fiber.

The determination of the length and the loss characteristic of the optical fiber may measure and determine the length and the loss characteristic of the optical fiber based on reflected light obtained from the output light reflected by the optical fiber.

The loss characteristic of the optical fiber may be defined as an optical power budget.

According to an aspect of the present invention, there is provided a signal transmission apparatus corresponding to an OLT or an ONU consisted of an OFDMA-PON, the signal transmission apparatus including a light source to emit output light, a photo detector to receive and determine a length and a loss characteristic of an optical fiber included in an optical link through which the output light travels, and an optical modem to determine and control a power level and a bit allocated to a subcarrier for an each OFDM subcarrier based on the length and the loss characteristic of the optical fiber.

The photo detector may measure and determine the length and the loss characteristic of the optical fiber based on reflected light obtained from the output light reflected by the optical fiber.

As described above, according to an exemplary embodiment, a minimum number of functional blocks are used in an OFDMA-PON system to identify a length and a loss characteristic of an optical fiber in a optical link for the OFDMA-PON, thereby providing a cost-efficient network architecture.

According to an exemplary embodiment, when transmitting data, an optical OFDM modem properly controls/distributes a bit and a power level of an each OFDM subcarrier based on an characteristic of an optical fiber to maximize transmission performances and bandwidths of upstream and downstream links, thereby realizing highly reliable data transmission.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 3 illustrates an example of look-up table for determining a modulation method according to an exemplary embodiment of the present invention.

DETAILED DESCRIPTION

Figure 1:
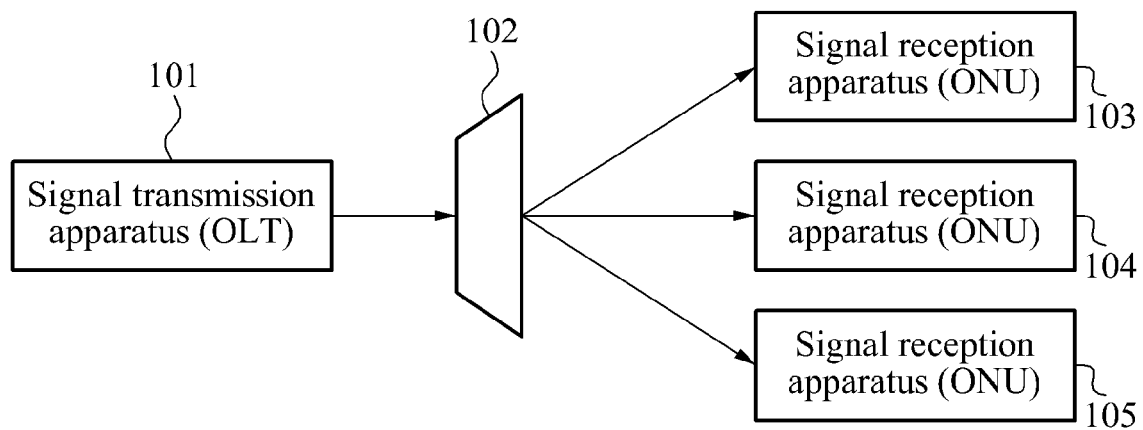
FIG. 1 illustrates a structure of an orthogonal frequency division multiplexing access-passive optical network (OFDMA-PON) according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 illustrates a structure of an orthogonal frequency division multiple access-passive optical network (OFDMA-PON) according to an exemplary embodiment of the present invention.

Referring to FIG. 1, the OFDMA-PON system may include one optical line terminal (OLT) 101 and a plurality of optical network units (ONUs) 103 to 105. The OFDMA-PON is a network system in which the plurality of ONUs 103 to 105 load data into different subcarriers, respectively, to be transmitted through optical fibers.

According to the present exemplary embodiment, the OLT 101 may transmit downstream data to the plurality of ONUs 103 to 105. Here, data output from the OLT 101 may be transmitted to the plurality of ONUs 103 to 105 through a splitter 102. In this instance, an optical OFDM modem included in the OLT 101 may modulate and transmit data based on a bit-power loading algorithm. In particular, the optical OFDM modem may dynamically modulate data based on previously measured characteristics of optical links between the OLT 101 and the plurality of ONUs 103 to 105. To this end, in the present exemplary embodiment, the characteristics of the optical links are acquired through a simple process and a method of modulating data is determined based on the link characteristics, thereby conducting cost-efficient data modulation.

In the present invention, when downstream data is transmitted a signal transmitting apparatus is in the OLT, while a signal reception unit is in the ONUs. Conversely, when upstream data is transmitted a signal transmitting apparatus is in the ONUs, while a signal receiving apparatus is in the OLT.

Figure 2:
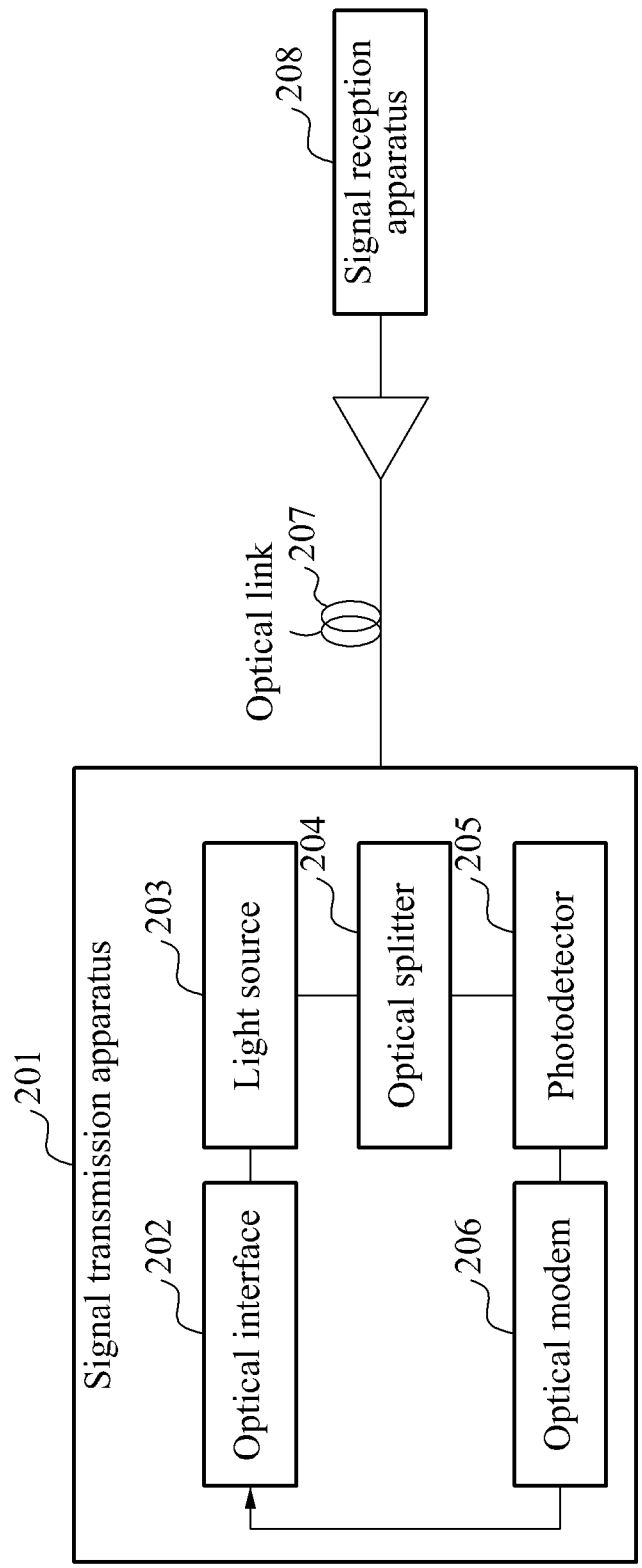
FIG. 2 is a block diagram illustrating a detailed configuration of a signal transmission apparatus according to an exemplary embodiment of the present invention.

FIG. 2 is a block diagram illustrating a detailed configuration of a signal transmission apparatus according to an exemplary embodiment of the present invention.

Referring to FIG. 2, the signal transmission apparatus 201 may include an optical interface 202, a light source 203, an optical splitter 204, a photo detector 205, and an optical modem 206.

The optical interface 202 may provide an RF signal or a DC bias signal to the light source. Then, the light source 203 may emit an optical signal based on the provided signal from the optical interface 202. Here, the light source 203 may emit continuous-wave output light. In one exemplary embodiment, the light source 203 may be included in the optical interface 202. The output light emitted from the light source 203 is emitted through the optical splitter 204 and transmitted to the signal reception apparatus 208 via the optical link 207 of the OFDMA-PON.

According to the present exemplary embodiment, the signal transmission apparatus 201 may include the optical splitter 204 and the photo detector 205 in order to determine basic characteristic for bit- and power-loading with respect to an each OFDM subcarrier.

When the output light emitted from the light source 203 is reflected by the optical link 207, the reflected light by the optical link 207 may be injected into the photo detector 205 via the optical splitter 204. Here, the optical splitter 204 may change an optical path so that the reflected light is not re-injected into the light source 203. The reflected light may be generated by Rayleigh scattering or Fresnel reflection of the output light emitted from the light source 203 while being transmitted through an optical fiber included in the optical link 207. That is, part of the output light returns in an opposite direction to a traveling direction of the output light, and the returning output light is defined as reflected light.

The photo detector 205 may measure and determine characteristics of the optical link 207 using the reflected light by the optical link 207. For example, the photo detector 205 may measure and determine a length of the optical fiber through which the output light is transmitted or a number of splits of the optical splitter 204 using the reflected light. For example, the photo detector 205 may detect the reflected light and determine a length of a feeder optical fiber connected in the optical link 207 and the number of splits of the optical splitter 204 based on change in a level of the reflected light, that is, a change in an intensity of the reflected light.

The optical modem 206 may determine and control a power level and a modulation method for an each OFDM subcarrier based on the characteristics of the optical link 207. For example, the optical modem 206 may select a modulation method having a lower subcarrier modulation speed as the length of the optical fiber increases and the optical splitter in which a greater number of splits are present in the characteristics of the optical link. Further, the optical modem 206 may increase the power level of the each subcarrier as the length of the optical fiber increases and corresponding to the optical splitter in which a greater number of splits are present. In particular, the optical modem 206 may select the power level and the modulation method for an each OFDM subcarrier corresponding to the length of the optical fiber and the number of splits of the optical splitter based on a previously defined and stored look-up table.

Subsequently, effective data output through the optical interface 202 may be changed depending on the selected power level and selected modulation method for the each subcarrier.

As another example, the photo detector 205 may measure and determine a length and a loss characteristic of the optical fiber. The optical modem 206 may then control a power level and a bit allocated to a each OFDM subcarrier for an optical signal based on the pre-determined length and loss characteristic of the optical fiber. Here, the loss characteristic of optical fiber may be defined as an optical power budget.

FIG. 3 illustrates a look-up table for determining a modulation method according to an exemplary embodiment of the present invention.

According to the present exemplary embodiment, an optical modem of a signal transmission apparatus may use a look-up table to select a modulation method based on characteristics of an optical link including optical fiber and optical splitter. For example, the look-up table may store an electric power level and a modulation method for an each OFDM subcarrier in advance based on a length of an optical link and a number of splits of an optical splitter.

By way of example, referring to the look-up table of FIG. 3, when the length of the optical link, that is, a data transmission distance, is 20 kilometers (km) and the optical splitter has 32 splits, the electric power level and the modulation method is determined to be B1. Here, B1 may modulate a subcarrier with 16 quadrature amplitude modulation (QAM) and set the power level of each subcarrier to −30 decibel milliwatts (dBm).

Further, when the length of the optical link is 40 km and the optical splitter has 64 splits, the electric power level and the modulation method is determined to be C2. Here, C2 may modulate a subcarrier with quadrature phase shift keying (QPSK) and set the power level of each subcarrier to −15 dBm.

Figure 4:
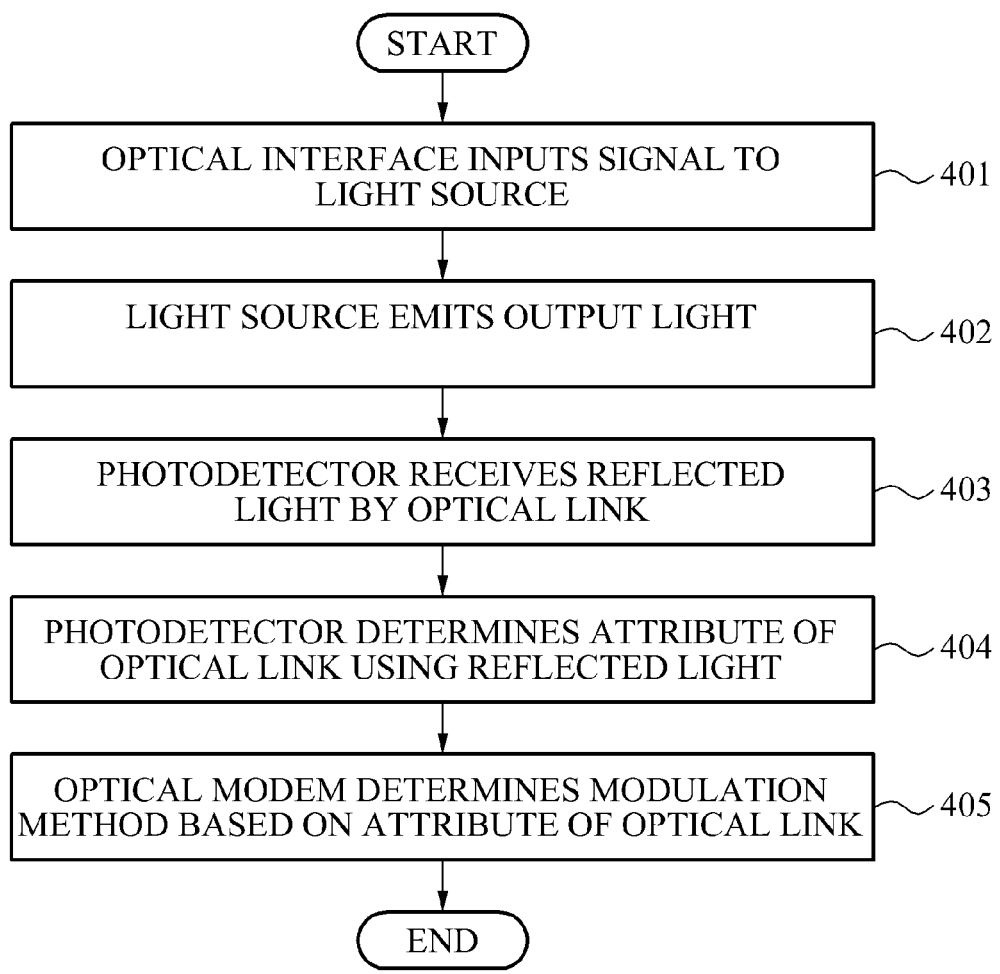
FIG. 4 illustrates a modulation method of an optical modem according to an exemplary embodiment of the present invention.

FIG. 4 illustrates a modulation method of an optical modem according to an exemplary embodiment of the present invention.

In operation 401, an optical interface may provide a signal to a light source. In operation 402, the light source may emit continuous-wave output light.

In operation 403, when the output light is reflected by an optical link, the photo detector may receive the light reflected by an optical link. Here, an optical splitter may change an optical path so that the reflected light is directed toward a photo detector rather than toward a light source.

In operation 404, the photo detector may determine characteristics of the optical link using the reflected light. Here, the photo detector may determine a length of the optical link and a number of splits of the optical splitter using change in an intensity of the reflected light.

In operation 405, the optical modem may determine an electric power level and a modulation method for each subcarrier based on the characteristics of the optical link, that is, the length of the optical link and the number of splits of the optical splitter. Here, the optical modem may determine the electric power level and the modulation method for each subcarrier using a look-up table set in advance based on the length of the optical link and the number of splits of the optical splitter.

A signal transmission apparatus corresponding to an optical line terminal (OLT) or an optical network unit (ONU) consisted of an orthogonal frequency division multiple access-passive optical network (OFDMA-PON), the signal transmission apparatus comprising: a light source to emit an output light; a photo detector to determine a length and a loss characteristic of an optical fiber included in an optical link through which the output light is transmitted; and an optical modem to control a power level and a bit allocated to an each OFDM subcarrier for an optical OFDM signal based on the length and the loss characteristic of the optical fiber. The photo detector determines the length and the loss characteristic of the optical fiber based on reflected light obtained from the output light reflected by the optical fiber. The loss characteristic of the optical fiber is defined as an optical power budget.

The above-described exemplary embodiments of the present invention may be recorded in computer-readable media including program instructions to implement various operations embodied by a computer. The media may also include, alone or in combination with the program instructions, data files, data structures, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A modulation method for an optical modem, wherein the method runs on a processor of the optical modem, comprising:
   providing a signal to a light source;
   receiving light reflected by an optical link when light output from the light source based on the provided input signal is reflected by the optical link;
   determining an characteristic of the optical link using the reflected light; and
   selecting a power level and a modulation method for each of a plurality of subcarriers in which optical signals are transmitted based on the determined characteristic of the optical link.

2. The modulation method of claim 1, wherein the determining of the characteristic for the optical link determines, using the light reflected by the optical link, a length of an optical fiber through which the output light is transmitted or a number of splits of an optical splitter.

3. The modulation method of claim 2, wherein the selecting the power level and the modulation method for the each of the plurality of subcarriers selects a power level and a modulation method for the each subcarrier corresponding to the length of the optical fiber and the number of splits of the optical splitter, based on a pre-defined look-up table.

4. The modulation method of claim 1, wherein an optical path of the light reflected by the optical link is changed by the optical splitter so that the light reflected by the optical link is not re-injected into the light source.

5. The modulation method of claim 1, wherein the selecting the power level and the modulation method for the each of the plurality of subcarriers selects a modulation method having a lower subcarrier modulation speed as a length of an optical fiber increases and an optical splitter in which a greater number of splits are present in the characteristic of the optical link.

6. The modulation method of claim 1, wherein the selecting the power level and the modulation method for the each of the plurality of subcarriers increases power levels of the each subcarrier as a length of an optical fiber increases and increasing power levels of the each subcarrier corresponding an optical splitter in which a greater number of splits are present in the characteristic of the optical link.

7. The modulation method of claim 1, wherein the reflected light is generated by Rayleigh scattering or Fresnel reflection during transmission through an optical fiber included in the optical link.

8. A signal transmission apparatus comprising:
   a light source to emit an output light;
   an optical interface to provide a signal so that the light source emits the output light;
   an optical splitter to change an optical path of light reflected by an optical link when the output light emitted from the light source is reflected by the optical link;
   a photo detector unit comprising a photo detector to receive the light reflected by the optical link, transmitted from the optical splitter and to determine characteristics of the optical link; and
   an optical modem to select a power level and a modulation method for each of a plurality of OFDM subcarriers in which optical signals are transmitted based on the characteristics of the optical link.

9. The signal transmission apparatus of claim 8, wherein the photo detector unit measures and determines a length of an optical fiber through which the output light is transmitted or a number of splits present in the optical splitter using the light reflected by the optical link.

10. The signal transmission apparatus of claim 8, wherein the optical modem selects a power level and a modulation method for the each of the plurality of subcarriers corresponding to a length of an optical fiber and a number of splits present in the optical splitter, based on a pre-defined look-up table.

11. The signal transmission apparatus of claim 8, wherein an optical path of the reflected light is changed by the optical splitter so that the reflected light is not re-injected into the light source.

12. The signal transmission apparatus of claim 8, wherein the optical modem selects a modulation method having a lower subcarrier modulation speed as a length of an optical fiber increases and an optical splitter in which a greater number of splits are present in the characteristics of the optical link.

13. The signal transmission apparatus of claim 8, wherein the optical modem increases the power level of the each of the plurality of subcarriers as a length of an optical fiber increases and increases the power level of the each of the plurality of subcarriers corresponding to the optical splitter in which a greater number of splits are present in the attribute of the optical link.

14. The signal transmission apparatus of claim 8, wherein the reflected light is generated by Rayleigh scattering or Fresnel reflection during transmission through an optical fiber included in the optical link.

15. A modulation method of an optical modem included in an optical line terminal (OLT) or an optical network unit (ONU) consisted of an orthogonal frequency division multiple access-passive optical network (OFDMA-PON), wherein the modulation method runs on a processor of the optical modem, the modulation method comprising:
   emitting, an output light;
   receiving light reflected by an optical link when the output light is reflected by the optical link;
   determining, using the reflected light, a length and a loss characteristic of an optical fiber included in the optical link through which the output light is transmitted; and
   controlling, a power level and a bit allocated to a subcarrier for an optical OFDM signal based on the length and the loss characteristic of the optical fiber.

16. The modulation method of claim 15, wherein the determining of the length and the loss characteristic of the optical fiber determines the length and the loss characteristic of the optical fiber based on a value of reflected light obtained from the output light reflected by the optical fiber.

17. The modulation method of claim 16, wherein the loss characteristic of the optical fiber is defined as an optical power budget.

* * * * *